United States Patent [19]
Bell et al.

[11] Patent Number: 6,013,720
[45] Date of Patent: Jan. 11, 2000

[54] PARTITIONING AGENT FOR RUBBER

[75] Inventors: Anthony Joseph Bell, Stow; Eilert Aloysius Ofstead, Cuyahoga Falls; Ronald Lee Holsapple, Uniontown, all of Ohio

[73] Assignee: The Goodyear Tire & Rubber Company, Akron, Ohio

[21] Appl. No.: 08/900,891

[22] Filed: Jul. 25, 1997

[51] Int. Cl.⁷ .............................. C08J 3/00; C08K 3/20; C08L 51/00; B32B 27/08
[52] U.S. Cl. ................. 524/543; 427/393.5; 428/517; 524/534
[58] Field of Search .................... 524/543, 534; 427/393.5; 428/517

[56] References Cited

U.S. PATENT DOCUMENTS

| | | | |
|---|---|---|---|
| 4,274,462 | 6/1981 | Ogawa et al. | 152/209 |
| 4,385,164 | 5/1983 | Sinclair et al. | 526/201 |
| 4,394,473 | 7/1983 | Winter et al. | 524/226 |
| 4,790,365 | 12/1988 | Sandstrom et al. | 152/510 |
| 4,957,970 | 9/1990 | Holsapple et al. | 525/99 |
| 5,021,381 | 6/1991 | Burroway et al. | 502/117 |

*Primary Examiner*—Patrick D. Niland
*Attorney, Agent, or Firm*—Alvin T Rockhill

[57] ABSTRACT

This invention discloses an aqueous slurry for coating the surface of rubber slabs or pellets to reduce the tendency of the rubber slabs or pellets to stick together, said aqueous slurry being comprised of (1) from about 1 weight percent to about 15 weight percent of syndiotactic-1,2-polybutadiene having a melting point of no more than about 140° C. and a particle size of no more than about 40 mesh; (2) from about 0.1 weight percent to about 5 weight percent of a suspending agent; (3) from about 0.05 weight percent to about 2 weight percent of a wetting agent; and (4) from about 78 weight percent to about 98 weight percent water. The present invention further reveals a coated rubber slab having resistance to sticking which is comprised of a rubber slab having a coating thereon, wherein said coating is comprised of syndiotactic-1,2-polybutadiene having a melting point of no more than about 140° C. and a particle size of no more than about 40 mesh.

15 Claims, No Drawings

PARTITIONING AGENT FOR RUBBER

BACKGROUND OF THE INVENTION

In the manufacture of finished rubber goods, rubber slabs (large sheets of rubber) are often intentionally stacked on pallets for interim storage and/or transportation before the next manufacturing step. Such slabs of rubber have a tendency to stick together during storage. This problem becomes more serious at higher storage temperatures and with longer storage periods. The problem with sticking is also more frequently encountered in cases where a large number of rubber slabs are piled on top of each other. This problem can be so serious that it is virtually impossible for workers to pull apart rubber slabs that are stuck together. In such cases, the rubber slab is non-processable and sometimes even becomes waste product. Similar problems with sticking are also encountered with uncured rubber compounds that are in the form of pellets or granules.

To overcome this problem, slabs and pellets of rubber are generally treated with slab dips or pellet dips to inhibit the tendency of the rubber to stick together. Conventional slab dips and pellet dips normally contain clay or some other inorganic powder. The inorganic powder coats the surfaces of the rubber and provides a physical barrier or partition that keeps the rubber in the individual slabs or pellets from coming into contact with rubber in other slabs or pellets. However, the use of such conventional slab dips and pellet dips can lead to undesirable dusting problems in plant work areas. More significantly, the residual inorganic powders that remain in finished rubber goods can be detrimental to ultimate rubber properties. For instance, inorganic powder particles can serve as the nucleus for cut or tear growth in the finisher rubber article.

Syndiotactic 1,2-polybutadiene (SPBD) is a thermoplastic resin which can be utilized in making films, fibers and molded articles. For example, U.S. Pat. No. 4,394,473 and U.S. Pat. No. 4,957,970 disclose the use of SPBD in making bags and packaging. It can also be blended into elastomers, such as polydiene rubbers. Because SPBD contains double bonds which are attached in an alternating fashion to its backbone, it can be cocured with the rubbers in such blends. In fact, SPBD/rubber blends provide a unique combination of properties which make them useful in various tire compounds.

U.S. Pat. No. 4,790,365 discloses that incorporation of SPBD into rubber compositions which are utilized in the supporting carcass or innerliner of tires greatly improves the green strength of those compositions. Electron beam precure (microwave precure) is a technique which has gained wide commercial acceptance as a means of improving the green strength of synthetic elastomers which are used in building tires. However, electron beam precure techniques are costly. The incorporation of SPBD into blends of such synthetic elastomers can often improve green strength to the degree that electron beam precure is not required. The incorporation of SPBD into halogenated butyl rubbers which are utilized as the innerliner compositions for tires also greatly improves the scorch safety of such compositions. U.S. Pat. No. 4,274,462 disclosed that pneumatic tires having improved resistance against heat buildup can be prepared by utilizing SPBD fibers in their tread-base rubber.

According to U.S. Pat. No. 4,790,365, the SPBD utilized in making the supporting carcass for tires has a melting point which is within the range of 120° C. to 190° C. and that it is preferred for the SPBD utilized in making the supporting carcass to have a melting point which is within the range of 150° C. to 165° C. The SPBD utilized in making tire innerliners has a melting point which is within the range of 120° C. to 160° C. and preferably has a melting point which is within the range of 125° C. to 150° C. The melting points referred to herein are minimum endotherm values determined from DSC (differential scanning calorimetry) curves.

SUMMARY OF THE INVENTION

This invention is based upon the unexpected discovery that aqueous slurries for coating the surface of rubber slabs and rubber pellets to reduce the sticking tendency thereof can be made utilizing syndiotactic-1,2-polybutadiene (SPBD). Such aqueous slurries are comprised of the SPBD, a suspending agent, a wetting agent and water. The SPBD utilized in the aqueous slurries of this invention will have a melting point of no more than about 140° C. and a particle size of no more than about 40 mesh.

The use of the aqueous slurry of this invention as a slab dip offers numerous advantages over conventional inorganic powder containing slab dips, such as clay-type slurries. For instance, dust generation in plant working areas is virtually eliminated and the need to frequently clean dip-tanks is greatly reduced. More importantly, the elimination of residual inorganic powders, such as clay, from the rubber improves finished product properties. For example, tires made with rubber slabs that have been dipped with the aqueous slab dips of this invention have better physical properties, including better cut and tear resistance. This is because particles of residual inorganic powder from conventional slab dips can act as the nucleus for cut or tear growth in finished rubber products. To the contrary, the SPBD employed in the slab dips of this invention can cocure with the rubber and does not serve as a site for cut or tear growth and may actually serve to enhance desirable properties.

The slab dips of this invention are highly effective in preventing slabs or pellets of rubber from sticking together. In fact, rubber slabs that have been treated with the slab dips of this invention can be stacked in a "wig-wag" fashion on skids in quantities as high as about 3000 pounds (1361 Kg) without encountering significant sticking problems even after long periods during which the rubber slabs are stored and transported.

This invention more specifically discloses an aqueous slurry for coating the surface of rubber slabs or pellets to reduce the tendency of the rubber slabs or pellets to stick together, said aqueous slurry being comprised of (1) from about 1 weight percent to about 15 weight percent of syndiotactic-1,2-polybutadiene having a melting point of no more than about 140° C. and a particle size of no more than about 40 mesh; (2) from about 0.1 weight percent to about 5 weight percent of a suspending agent; (3) from about 0.05 weight percent to about 2 weight percent of a wetting agent; and (4) from about 78 weight percent to about 98 weight percent water.

The subject invention also reveals a coated rubber slab having resistance to sticking which is comprised of a rubber slab having a coating thereon, wherein said coating is comprised of syndiotactic-1,2-polybutadiene having a melting point of no more than about 140° C. and a particle size of no more than about 40 mesh.

The present invention further discloses a process for reducing the sticking tendencies of a rubber slab which comprises: (I) passing the rubber slab through an aqueous slurry which is comprised of (1) from about 1 weight percent to about 15 weight percent of syndiotactic-1,2- polybutadiene having a melting point of no more than about 140° C. and a particle size of no more than about 40 mesh, (2) from about 0.1 weight percent to about 5 weight percent of a suspending agent, (3) from about 0.05 weight percent to about 2 weight percent of a wetting agent and (4) from about 78 weight percent to about 98 weight percent water, wherein the rubber slab is at a temperature which is within the range of about 40° C. to about 170° C.; and (II) drying the dipped rubber slab.

DETAILED DESCRIPTION OF THE INVENTION

The aqueous slurries of this invention can be used as slab dips or pellet dips. These slurries are comprised of SPBD, a suspending agent, a wetting agent and water. These aqueous slurries will typically be comprised of (1) from about 1 weight percent to about 15 weight percent of SPBD having a melting point of no more than about 140° C. and a particle size of no more than about 40 mesh; (2) from about 0.1 weight percent to about 5 weight percent of the suspending agent; (3) from about 0.05 weight percent to about 2 weight percent of the wetting agent; and (4) from about 78 weight percent to about 98 weight percent water.

Slab dips will preferably be comprised of (1) from about 2 weight percent to about 7 weight percent of the SPBD; (2) from about 0.2 weight percent to about 3 weight percent of the suspending agent; (3) from about 0.1 weight percent to about 1 weight percent of the wetting agent; and (4) from about 89 weight percent to about 97 weight percent water. The slab dips of this invention will more preferably be comprised of (1) from about 3 weight percent to about 6 weight percent of the SPBD; (2) from about 0.5 weight percent to about 2 weight percent of the suspending agent; (3) from about 0.3 weight percent to about 0.7 weight percent of the wetting agent; and (4) from about 92 weight percent to about 96 weight percent water.

The pellet dip formulations of this invention will normally contain more SPBD than typical slab dip formulations. For instance, it is preferred for pellet dip formulations to be comprised of (1) from about 5 weight percent to about 15 weight percent of the SPBD; (2) from about 0.2 weight percent to about 3 weight percent of the suspending agent; (3) from about 0.1 weight percent to about 1 weight percent of the wetting agent; and (4) from about 81 weight percent to about 93 weight percent water. It is most preferred for the aqueous pellet dips of this invention to be comprised of (1) from about 6 weight percent to about 12 weight percent of the SPBD; (2) from about 0.5 weight percent to about 2 weight percent of the suspending agent; (3) from about 0.3 weight percent to about 0.7 weight percent of the wetting agent; and (4) from about 86 weight percent to about 92 weight percent water.

The SPBD utilized in the slab dips and pellet dips of this invention will have a melting point of no more than about 140° C. and a particle size of no more than about 40 mesh (420 microns). The SPBD will normally have a melting point that is within the range of about 100° C. to about 140° C. It is typically preferred for the SPBD to have a melting point which is within the range of about 105° C. to about 135° C. It is generally most preferred for the SPBD to have a melting point which is within the range of about 120° C. to about 130° C. It is normally preferred for the SPBD to have a particle size of less than about 60 mesh (250 microns). The SPBD will typically have a particle size of at least about 140 mesh (105 microns). Thus, the SPBD will frequently have a particle size that is within the range of about 140 mesh (105 microns) to about 60 mesh (250 microns).

The SPBD will normally have at least about 70 percent of its monomeric units in a syndiotactic 1,2-configuration. In most cases, the SPBD will have from about 75 percent to about 95 percent of its monomeric units in a syndiotactic 1,2-configuration.

Techniques for preparing SPBD by polymerizing 1,3-butadiene monomer are well known in the art. These techniques include solution polymerization, suspension polymerization and emulsion polymerization. The SPBD made utilizing these techniques typically have a melting point within the range of about 195° C. to about 215° C. It is accordingly necessary to reduce the melting point of the SPBD to render it suitable for utilization in the aqueous slab and pellet dip compositions of this invention.

A process is disclosed in U.S. Pat. No. 3,778,424 for the preparation of syndiotactic 1,2-polybutadiene which comprises polymerizing 1,3-butadiene in an organic solvent in the presence of a catalyst composition composed of:

(a) a cobalt compound, (b) an organoaluminum compound of the formula $AlR_3$ in which R is a hydrocarbon radical of 1–6 carbons and (c) carbon disulfide.

U.S. Pat. No. 3,901,868 reveals a process for producing a butadiene polymer consisting essentially of syndiotactic 1,2-polybutadiene by the successive steps of:

(a) preparing a catalyst component solution by dissolving, in an inert organic solvent containing 1,3-butadiene, a cobalt compound, soluble in the organic solvent, such as (i) cobalt-β-diketone complex, (ii) cobalt-β-keto acid ester complex, (iii) cobalt salt of organic carboxylic acid and (iv) halogenated cobalt-ligand compound complex and an organoaluminum compound, (b) preparing a catalyst composition by mixing the catalyst component solution (prepared in step a) with an alcohol, ketone or aldehyde compound and carbon disulfide, (c) providing a polymerization mixture containing desired amounts of 1,3-butadiene, the catalyst composition and an inert organic solvent and (d) polymerizing 1,3-butadiene at a temperature which is within the range of −20° C. to 90° C.

U.S. Pat. No. 3,901,868 indicates that the melting point of the SPBD produced varies in response to the proportion of alcohol, ketone or aldehyde in the polymerization mixture. U.S. Pat. No. 4,153,767 shows that amide compounds, such as N,N-dimethylformamide, can be used in solution polymerizations to reduce the melting point of SPBD being synthesized.

U.S. Pat. No. 4,429,085 discloses a process for producing syndiotactic 1,2-polybutadiene by suspension polymerization in an aqueous medium. In this aqueous polymerization process, polybutadiene which has an essentially syndiotactic 1,2-microstructure is made by the steps of:

(A) preparing a catalyst component solution by dissolving, in an inert organic solvent containing 1,3-butadiene (a) at least one cobalt compound selected from the group consisting of (i) β-diketone complexes of cobalt, (ii) β-keto acid ester complexes of cobalt, (iii) cobalt salts of organic carboxylic acids having 6 to 15 carbon atoms and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides and (b) at least one organoaluminum compound of the formula $AlR_3$, wherein R represents a hydrocarbon radical of 1 to 6 carbon atoms;

(B) preparing a reaction mixture by mixing said catalyst component solution with a 1,3-butadiene/water mixture containing desired amounts of said 1,3-butadiene;

(C) preparing a polymerization mixture by mixing carbon disulfide throughout said reaction mixture; and (D) polymerizing said 1,3-butadiene in said polymerization mixture into polybutadiene while agitating said polymerization mixture.

U.S. Pat. No. 4,751,275 discloses a process for the preparation of SPBD by the solution polymerization of 1,3-butadiene in a hydrocarbon polymerization medium, such as benzene, toluene, cyclohexane or n-hexane. The catalyst system used in this solution polymerization contains a chromium-III compound which is soluble in hydrocarbons, a trialkylaluminum compound and a dialkylphosphite, such as di-neopentylphosphite or di-butylphosphite.

U.S. Pat. No. 4,902,741 and U.S. Pat. No. 5,021,381 disclose a process for preparing a syndiotactic 1,2-polybutadiene latex by emulsion polymerization which comprises polymerizing 1,3-butadiene monomer in an aqueous reaction mixture which is comprised of (1) water, (2) at least one emulsifier, (3) 1,3-butadiene monomer, (4) a catalyst emulsion composition which is prepared by dissolving in an inert organic solvent containing at least one polyene (a) at least one cobalt compound selected from the group consisting of (i) β-ketone complexes of cobalt, (ii) β-keto acid ester complexes of cobalt, (iii) cobalt salts of organic carboxylic acids having 6 to 15 carbon atoms and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides and (b) at least one organoaluminum compound of the formula $AlR_3$ wherein R represents a hydrocarbon radical of 1 to 6 carbon atoms to produce a catalyst component solution, and microfluidizing the catalyst component solution with an oil, a surfactant and water to an average particle size which is within the range of about 10 nanometers to about 1000 nanometers and (5) at least one member selected from the group consisting of carbon disulfide and phenyl isothiocyanate.

The synthesis of SPBD in an aqueous medium offers several important advantages over solution polymerizations. Water, as a medium in which to carry out such a polymerization, is less expensive, more easily purified and has a higher heat capacity. Conducting such polymerizations in an aqueous medium also permits for higher monomer and higher solids concentrations because of the lower viscosity of a polymer suspension or emulsion compared with that of a polymer solution. The main drawback associated with aqueous suspension and emulsion polymerizations for producing SPBD is the difficulty associated with reducing the melting point of the SPBD. In other words, it is difficult to control the chemical structure and hence the crystallinity and melting point of SPBD which is synthesized in an aqueous medium. Even though numerous modifiers can be used to reduce the level of crystallinity and resulting melting point of SPBD which is synthesized in solution, there are few efficient modifiers for reducing the crystallinity of SPBD which is synthesized in an aqueous medium.

U.S. Pat. No. 5,011,896 discloses the use of 4-(alkylamino)benzaldehydes, 4-(dialkylamino) benzaldehydes, 2,4-di-(alkoxy)benzaldehydes, 2,6-di-(alkoxy)benzaldehydes, 2,4,6-tri-(alkoxy)benzaldehydes and 4-(1-azacycloalkyl)benzaldehydes as modifiers for reducing the melting point of SPBD which is synthesized in an aqueous medium. U.S. Pat. No. 5,405,816 discloses the utilization of N,N-dibutylformamide as a highly effective modifier for reducing the melting point of SPBD synthesized in such polymerizations.

The SPBD used in practicing this invention will typically be synthesized utilizing aqueous suspension polymerization techniques or emulsion polymerization techniques. The catalyst system and general procedure needed for polymerizing 1,3-butadiene monomer into SPBD is described in U.S. Pat. No. 4,429,085. Such suspension polymerization techniques can be utilized in synthesizing the SPBD used in making the aqueous slurries of this invention and the teachings of U.S. Pat. No. 4,429,085 are incorporated herein by reference in their entirety. A useful technique for preparing SPBD by emulsion polymerization is described in U.S. Pat. No. 4,902,741 and U.S. Pat. No. 5,021,381. The emulsion polymerization procedures described therein can also be used in synthesizing SPBD which is useful in the practice of this invention and the teachings of U.S. Pat. No. 4,902,741 and U.S. Pat. No. 5,021,381 are accordingly incorporated herein by reference in their entirety.

As a general rule, the aqueous polymerization medium will contain from about 0.05 to about 2 phm (parts per hundred parts by weight of monomer) of a melting-point regulator. Usually from about 0.1 phm to about 1 phm of the melting-point regulator will be employed. In most cases where N,N-dibutylformamide is employed as the melting-point regulator, normally from about 0.1 phm to about 0.5 phm of the N,N-dibutylformamide will be utilized. To attain good conversions, less than about 0.5 phm and preferably less than about 0.25 phm of the N,N-dibutylformamide will be utilized. The table below shows the approximate relationship between conversion, melting point and the amount of N,N-dibutylformamide utilized as a melting-point regulator.

| Amount of N,N-dibutylformamide | SPBD Melting Point |
| --- | --- |
| 0 | 188° C. |
| 0.25 phm | 120° C. |
| 0.50 phm | 110° C. |
| 1.00 phm | 105° C. |
| 1.25 phm | 104° C. |

The suspending agent employed in the slab dips and pellet dips of this invention will act to thicken the slurry to keep the SPBD suspended therein. Some representative examples of suspending agents that can be employed include gelatin, polyvinyl alcohol, polyacrylamides, sodium carboxymethyl cellulose, bentonite, starch, synthetic gums, sodium carboxymethylhydroxyethylcellulose, hydroxyethylcellulose, methylcellulose, methylhydroxypropylcellulose, ethylhydroxyethylcellulose, methylethylcellulose, methylhydroxyethylcellulose, magnesium silicate (talc), feldspar, hydrous calcium magnesium silicate, magnesium carbonate, and the like and mixtures of the same.

A wide variety of wetting agents that will act to reduce the surface tension of the aqueous slurry can be utilized in the slab dips and pellet dips of this invention. In most cases, the wetting agent will be a nonionic surfactant. The nonionic surfactants which can be utilized as wetting agents will normally have a hydrophile-lipophile balance (HLB) number of less than about 12. It is generally preferred for such nonionic surfactants to have an HLB number of less than about 11 with HLB numbers which are within the range of 5 to 10 being most preferred. HLB numbers are indicative of a surfactant's emulsification behavior and relate to the balance between the hydrophilic and lipophilic (hydrophobic) portions of the molecule. HLB numbers are further described in Griffin, W. C., J. Soc. Cosmet. Chem. 1, 311 (1949) which is incorporated herein by reference. The HLB number of a given surfactant generally decreases with increasing temperatures. Surfynol™ 440 ethoxylated acetylenic diol is a representative example of a suitable wetting agent having a HLB of about 8.

Water-insoluble nonionic surfactants which contain low levels (from 1 to about 8) ethylene oxide repeat units can be employed as wetting agents in the aqueous slurries of this invention. These nonionic surfactants can have the structural formula:

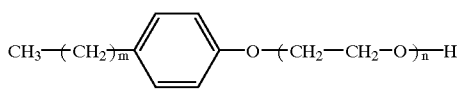

wherein n is an integer from 1 to about 8 and wherein m is an integer from about 6 to about 12. It is normally preferred for m to be 8 or 9. The HLB number of such compounds increases with increasing levels of ethylene oxide incorporation. The HLB number of such compounds increases as a function of n as follows:

| n | HLB Number |
|---|---|
| 1 | 3.6 |
| 3 | 7.8 |
| 4 | 10.4 |
| 10 | 13.5 |
| 16 | 15.8 |
| 30 | 17.3 |
| 40 | 17.9 |

Polyols which are copolymers of ethylene oxide and propylene oxide can also be employed as the wetting agent. Such polyols have the structural formula:

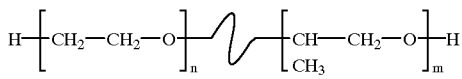

wherein n and m are integers, wherein the ratio of m to n is at least about 5:1 and wherein $\sim$ indicates that the distribution of monomeric units can be random. The polyols which can be used also have molecular weights of at least about 1500. The polyols which are preferred contain less than about 10 percent bound ethylene oxide (have a ratio of m to n of at least about 10:1).

The slab dips and pellet dips of this invention can be prepared by simply mixing the appropriate amounts of the SPBD, suspending agent and wetting agent into water. This mixing step will, of course, be carried out using a means for agitation the slurry to attain a good mixture.

After the aqueous slurry has been made, it can be employed as a slab dip or a pellet dip. While the process of the present invention is particularly useful for treating hot rubber which has just been mixed in a Banbury mixer and passed through a sheet mill to form a continuous hot sheet or slab, it will be appreciated that it can apply to any milled, extruded, calendered, laminated or warmed, tacky rubber stocks to prevent the rubber stocks from sticking together when piled, shelved or stored awaiting subsequent processing in the manufacture of tires, hoses, belts and other rubber products. Moreover, while the dip of the present invention is useful with slab, strip or sheet rubberstock, especially in continuous form, it also can be used on separate pieces, formed or not, or in the form of powders, pellets, crumb or particles and so forth to prevent them from sticking together.

As an illustration of the present invention, the hot (about 40° C. to 170° C.) masticated rubber stock from the Banbury mixer is passed through a sheeting mill to form a continuous hot sheet or slab and the continuous hot slab is dipped in a dip tank containing the slab dip composition of this invention. In the case of "hot dip systems," non-productive rubber slabs will be at a temperature which is within the range of about 140° C. to about 170° C. and productive rubber slabs will be at a temperature which is within the range of about 90° C. to about 110° C. when they are dipped. In the case of "cold dip systems," non-productive rubber slabs will be at a temperature which is within the range of about 80° C. to about 100° C. and productive rubber slabs will be at a temperature which is within the range of about 40° C. to about 70° C. when they are dipped.

The rubber slab will typically have a residence time in the dip of about 1 second to about 2 seconds. The slab can be maintained in the dip tank for a longer period. However, there is typically no benefit associated with maintaining the rubber slab in the dip tank for more than about 2 seconds. The vessel used as the dip tank will normally be provided with agitators, stirrers and/or pumps that are designed to keep the SPBD well dispersed throughout the aqueous slurry.

After exiting the dip tank, the rubber slab is dried. This is normally accomplished by blowing air onto the surfaces of the slab. Either warm air or cold air can be employed in the drying step. Cold air offers the advantage of more rapidly cooling the rubber slab. However, warm air provides a more rapid rate of water evaporation. In any case, during the air drying step, the rubber sheet or slab can be carried on a series of rotating shafts with long loops between the shafts (festooned) to save space. After being cooled to a temperature of no more than about 50° C., and preferably no more than about 40° C., the rubber slab is normally stacked "wig-wag" style on skids for subsequent transportation and usage.

Rubber slabs that are treated with the slab dips of this invention normally "pick-up" from about 0.02 weight percent to about 0.5 weight percent of SPBD coating. Thus, from about 0.02 weight percent to about 0.5 weight percent SPBD will be coated on the surface of the dry rubber slab, based upon the total weight of the SPBD coated rubber slab. It is typically preferred for the rubber slab to have from about 0.05 weight percent to about 0.1 weight percent of the SPBD on the surface thereof. From about 0.05 weight percent to about 1 weight percent SPBD will normally be coated on the surface of dry rubber pellets that are coated with the pellet dips of this invention, based upon the total weight of the coated rubber pellets. It is typically preferred for rubber pellets to have from about 0.1 weight percent to about 0.2 weight percent of the SPBD on the surface thereof.

The following working examples illustrate various embodiments of the process of the present invention. These examples are intended merely to illustrate the present invention and not in any sense to limit the scope in which the present invention can be practiced. Unless specifically indicated otherwise, parts and percentages are given by weight.

EXAMPLE 1

In this experiment, a slab dip was made by mixing 5 parts of SPBD, 2 parts of Paragum™ 141 suspending agent (13.5 percent polyacrylates) and 0.5 parts of Igepal™ CO 630 into 92.5 parts of water. The SPBD employed had a melting point of 125° C. and a 100 mesh particle size.

A rubber slab which was about 0.25 inches thick was passed through a dip tank containing the slab dip. The slab dip was agitated during the dipping procedure to keep the SPBD well dispersed throughout the aqueous slurry. The rubber slab had a residence time in the slab dip of about 1–2 seconds. After exiting the dip, the rubber slab was air-dried. Then about 2000 pounds of the rubber slab was stacked wig-wag style on a skid. Sticking problems were not encountered with the skid of rubber slab. Thus, the slab dip of this invention proved to provide good protection against sticking. Additionally, the problem of dust formation which is typically encountered with conventional slab dips was eliminated. More importantly, the rubber did not contain residual clay or other inorganic particles from the slab dip.

While certain representative embodiments and details have been shown for the purpose of illustrating the subject invention, it will be apparent to those skilled in this art that various changes and modifications can be made therein without departing from the scope of this invention.

What is claimed is:

1. An aqueous slurry for coating the surface of rubber slabs or pellets to reduce the tendency of the rubber slabs or pellets to stick together, said aqueous slurry being comprised of (1) from about 1 weight percent to about 15 weight percent of syndiotactic-1,2-polybutadiene having a melting point of no more than about 140° C. and a particle size of no more than about 40 mesh; (2) from about 0.1 weight percent to about 5 weight percent of a suspending agent selected from the group consisting of gelatin, polyvinyl alcohol, polyacrylamides, sodium carboxymethyl cellulose, bentonite, starch, synthetic gums, sodium carboxymethylhydroxyethylcellulose, hydroxyethylcellulose, methylcellulose, methylhydroxypropylcellulose, ethylhydroxyethylcellulose, methylethylcellulose, methylhydroxyethylcellulose, magnesium silicate, feldspar, hydrous calcium magnesium silicate and magnesium carbonate; (3) from about 0.05 weight percent to about 2 weight percent of a wetting agent selected from the group consisting of nonionic surfactants having a hydrophile-lipophile balance number of less than about 12 and polyols that are copolymers of ethylene oxide and propylene oxide; and (4) from about 78 weight percent to about 98 weight percent water.

2. A process for reducing the sticking tendencies of a rubber slab which comprises: (1) passing the rubber slab through an aqueous slurry which is comprised of (1) from about 1 weight percent to about 15 weight percent of syndiotactic-1,2-polybutadiene having a melting point of no more than about 140° C. and a particle size of no more than about 40 mesh, (2) from about 0.1 weight percent to about 5 weight percent of a suspending agent selected from the group consisting of gelatin, polyvinyl alcohol, polyacrylamides, sodium carboxymethyl cellulose, bentonite, starch, synthetic gums, sodium carboxymethylhydroxyethylcellulose, hydroxyethylcellulose, methylcellulose, methylhydroxypropylcellulose, ethylhydroxyethylcellulose, methylethylcellulose, methylhydroxyethylcellulose, magnesium silicate, feldspar, hydrous calcium magnesium silicate and magnesium carbonate, (3) from about 0.05 weight percent to about 2 weight percent of a wetting agent selected from the group consisting of nonionic surfactants having a hydrophile-lipophile balance number of less than about 12 and polyols that are copolymers of ethylene oxide and propylene oxide, and (4) from about 78 weight percent to about 98 weight percent water, wherein the rubber slab is at a temperature which is within the range of about 40° C. to about 170° C.; and (II) drying the dipped rubber slab.

3. An aqueous slurry as specified in claim 1 wherein said aqueous slurry is formulated as a slab dip and wherein said aqueous slurry comprised of (1) from about 2 weight percent to about 7 weight percent of the syndiotactic-1,2-polybutadiene; (2) from about 0.2 weight percent to about 3 weight percent of a suspending agent; (3) from about 0.1 weight percent to about 1 weight percent of a wetting agent; and (4) from about 89 weight percent to about 97 weight percent water.

4. An aqueous slurry as specified in claim 3 wherein said syndiotactic-1,2-polybutadiene has a particle size of no more than about 60 mesh.

5. An aqueous slurry as specified in claim 4 wherein said syndiotactic-1,2-polybutadiene has a melting point which is within the range of about 100° C. to about 140° C.

6. An aqueous slurry as specified in claim 4 wherein said aqueous slurry comprised of (1) from about 3 weight percent to about 6 weight percent of the syndiotactic-1,2-polybutadiene; (2) from about 0.5 weight percent to about 2 weight percent of a suspending agent; (3) from about 0.3 weight percent to about 0.7 weight percent of a wetting agent; and (4) from about 92 weight percent to about 96 weight percent water.

7. An aqueous slurry as specified in claim 6 wherein said syndiotactic-1,2-polybutadiene has a melting point which is within the range of about 105° C. to about 135° C.

8. An aqueous slurry as specified in claim 1 wherein said aqueous slurry is formulated as a pellet dip and wherein said aqueous slurry comprised of (1) from about 5 weight percent to about 15 weight percent of the syndiotactic-1,2-polybutadiene; (2) from about 0.2 weight percent to about 3 weight percent of a suspending agent; (3) from about 0.1 weight percent to about 1 weight percent of a wetting agent; and (4) from about 81 weight percent to about 93 weight percent water.

9. An aqueous slurry as specified in claim 8 wherein said syndiotactic-1,2-polybutadiene has a particle size of no more than about 60 mesh.

10. An aqueous slurry as specified in claim 9 wherein said syndiotactic-1,2-polybutadiene has a melting point which is within the range of about 100° C. to about 140° C.

11. An aqueous slurry as specified in claim 10 wherein said aqueous slurry comprised of (1) from about 6 weight percent to about 12 weight percent of the syndiotactic-1,2-polybutadiene; (2) from about 0.5 weight percent to about 2 weight percent of a suspending agent; (3) from about 0.3 weight percent to about 0.7 weight percent of a wetting agent; and (4) from about 86 weight percent to about 92 weight percent water.

12. An aqueous slurry as specified in claim 11 wherein said syndiotactic-1,2-polybutadiene has a melting point which is within the range of about 105° C. to about 135° C.

13. An aqueous slurry as specified in claim 1 wherein said wetting agent is a nonionic surfactant having a hydrophile-lipophile balance number of less than about 12.

14. An aqueous slurry as specified in claim 13 wherein said wetting agent is a nonionic surfactant having a hydrophile-lipophile balance number which is within the range of about 5 to about 10.

15. A process as specified in claim 2 wherein said dipped rubber slab is dried in air.

* * * * *